US012760788B2

(12) United States Patent
Ojima et al.

(10) Patent No.: US 12,760,788 B2
(45) Date of Patent: Oct. 13, 2026

(54) DRIVING DEVICE

(71) Applicants: TOYOTA JIDOSHA KABUSHIKI KAISHA, Toyota (JP); AISIN CORPORATION, Kariya (JP)

(72) Inventors: Yasukuni Ojima, Kariya (JP); Eiji Kida, Kariya (JP); Taiki Owari, Kariya (JP); Takumi Harada, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 0 days.

(21) Appl. No.: 19/311,079

(22) Filed: Aug. 27, 2025

(65) Prior Publication Data

US 2026/0063192 A1 Mar. 5, 2026

(30) Foreign Application Priority Data

Aug. 29, 2024 (JP) ................................ 2024-147666

(51) Int. Cl.
*F16H 57/04* (2010.01)
*F16H 37/08* (2006.01)
(Continued)

(52) U.S. Cl.
CPC ......... *F16H 37/082* (2013.01); *F16H 57/021* (2013.01); *F16H 57/0436* (2013.01);
(Continued)

(58) Field of Classification Search
CPC .. F16H 37/082; F16H 57/021; F16H 57/0436; F16H 63/04; F16H 63/304;
(Continued)

(56) References Cited

U.S. PATENT DOCUMENTS 5,517,876 A 5/1996 Genise et al.
2010/0267508 A1* 10/2010 Hvolka .................... F16H 3/78 475/149
(Continued)

FOREIGN PATENT DOCUMENTS

CN 113715614 A 11/2021
DE 102012007623 A1 10/2013
(Continued)

*Primary Examiner* — Justin Holmes
(74) *Attorney, Agent, or Firm* — Dinsmore & Shohl LLP

(57) ABSTRACT

The driving device may comprise a motor, a first shaft configured to be driven by the motor, a planetary gear mechanism, a casing that houses the planetary gear mechanism, an output shaft, and a transmission mechanism. The planetary gear mechanism may comprise a sun gear, a ring gear, a carrier, and a planetary gear. The transmission mechanism may be configured to switch an operation mode of the planetary gear mechanism among multiple modes. The first shaft may be mechanically connected to the sun gear. The output shaft may be mechanically connected to the carrier. In a first mode, rotation of the ring gear relative to the casing is prohibited but rotation of the ring gear relative to the carrier is permitted. In a second mode, the rotation of the ring gear relative to the carrier is prohibited but the rotation of the ring gear relative to the casing is permitted.

12 Claims, 3 Drawing Sheets

(51) Int. Cl.

| | |
|---|---|
| ***F16H 57/021*** | (2012.01) |
| ***F16H 63/04*** | (2006.01) |
| ***F16H 63/30*** | (2006.01) |
| *F16H 57/02* | (2012.01) |

(52) U.S. Cl.
CPC ........... *F16H 63/04* (2013.01); *F16H 63/304* (2013.01); *F16H 2057/02034* (2013.01); *F16H 2057/02052* (2013.01); *F16H 57/0483* (2013.01); *F16H 57/0484* (2013.01); *F16H 2063/3063* (2013.01); *F16H 2063/3089* (2013.01); *F16H 2200/0021* (2013.01); *F16H 2200/0034* (2013.01); *F16H 2200/2005* (2013.01); *F16H 2200/2094* (2013.01)

(58) Field of Classification Search
CPC ............. F16H 57/0483; F16H 57/0484; F16H 2057/02034; F16H 2057/02052; F16H 2063/3063; F16H 2063/3089; F16H 2200/0021; F16H 2200/0034; F16H 2200/2005; F16H 2200/2094
See application file for complete search history.

(56) References Cited

U.S. PATENT DOCUMENTS

| | | | | |
|---|---|---|---|---|
| 2015/0226297 | A1* | 8/2015 | Knoblauch | .......... B60K 17/046 475/150 |
| 2020/0080598 | A1 | 3/2020 | Rupp et al. | |
| 2021/0370764 | A1 | 12/2021 | Park et al. | |
| 2022/0107021 | A1 | 4/2022 | Sato et al. | |
| 2024/0247713 | A1 | 7/2024 | Kosaka | |

FOREIGN PATENT DOCUMENTS

| | | | | |
|---|---|---|---|---|
| DE | 102017220073 | A1 | 10/2018 | |
| JP | 2016-043909 | A | 4/2016 | |
| JP | 6938678 | B2 | 9/2021 | |
| WO | 2013/156259 | A1 | 10/2013 | |
| WO | 2019/091719 | A1 | 5/2019 | |
| WO | WO-2022174847 | A1 * | 8/2022 | ............... B60K 1/02 |

* cited by examiner

DRIVING DEVICE

CROSS-REFERENCE TO RELATED APPLICATIONS

This application claims priority from Japanese Patent Application No. 2024-147666 filed on Aug. 29, 2024. The entire content of the priority applications is incorporated herein by reference.

TECHNICAL FIELD

The art disclosed herein relates to a driving device for a vehicle.

BACKGROUND ART

JP Patent No. 6,938,678 describes a motor-incorporated driving device for a vehicle.

SUMMARY

A motor-driven driving device is under a demand to incorporate a transmission mechanism. However, by having such a transmission mechanism, there are risks such as a structure thereof becoming more complicated and a size of the driving device becoming larger.

The technique disclosed herein is implemented as a driving device for a vehicle. The driving device may comprise a motor. The driving device may comprise a first shaft configured to be driven by the motor. The driving device may comprise a planetary gear mechanism that comprises a sun gear, a ring gear, a carrier, and a planetary gear. The driving device may comprise a casing that houses the planetary gear mechanism. The driving device may comprise an output shaft configured to output driving force to outside. The driving device may comprise a transmission mechanism configured to switch an operation mode of the planetary gear mechanism among multiple modes. The first shaft may be mechanically connected to the sun gear. The output shaft may be mechanically connected to the carrier. The multiple modes may include a first mode in which rotation of the ring gear relative to the casing is prohibited but rotation of the ring gear relative to the carrier is permitted. The multiple modes may include a second mode in which the rotation of the ring gear relative to the carrier is prohibited but the rotation of the ring gear relative to the casing is permitted.

In the above configuration, in the first mode, the carrier can rotate about a central axis of the sun gear. Due to this, rotation of the first shaft is output to the output shaft after being decelerated by the planetary gear mechanism. Further, in the second mode, the carrier and ring gear rotate together with the sun gear. Due to this, the rotation of the first shaft is output to the output shaft without being decelerated by the planetary gear mechanism. That is, the planetary gear mechanism can be switched between the first mode in which it functions as a reduction gear and the second mode in which it does not function as a reduction gear. By using the planetary gear mechanism, there is no need to add new transmission gear(s) or other component(s). Thus, it becomes possible to incorporate a transmission mechanism in the driving device while suppressing structural complexity and size increase.

DETAILED DESCRIPTION

Figure 1:
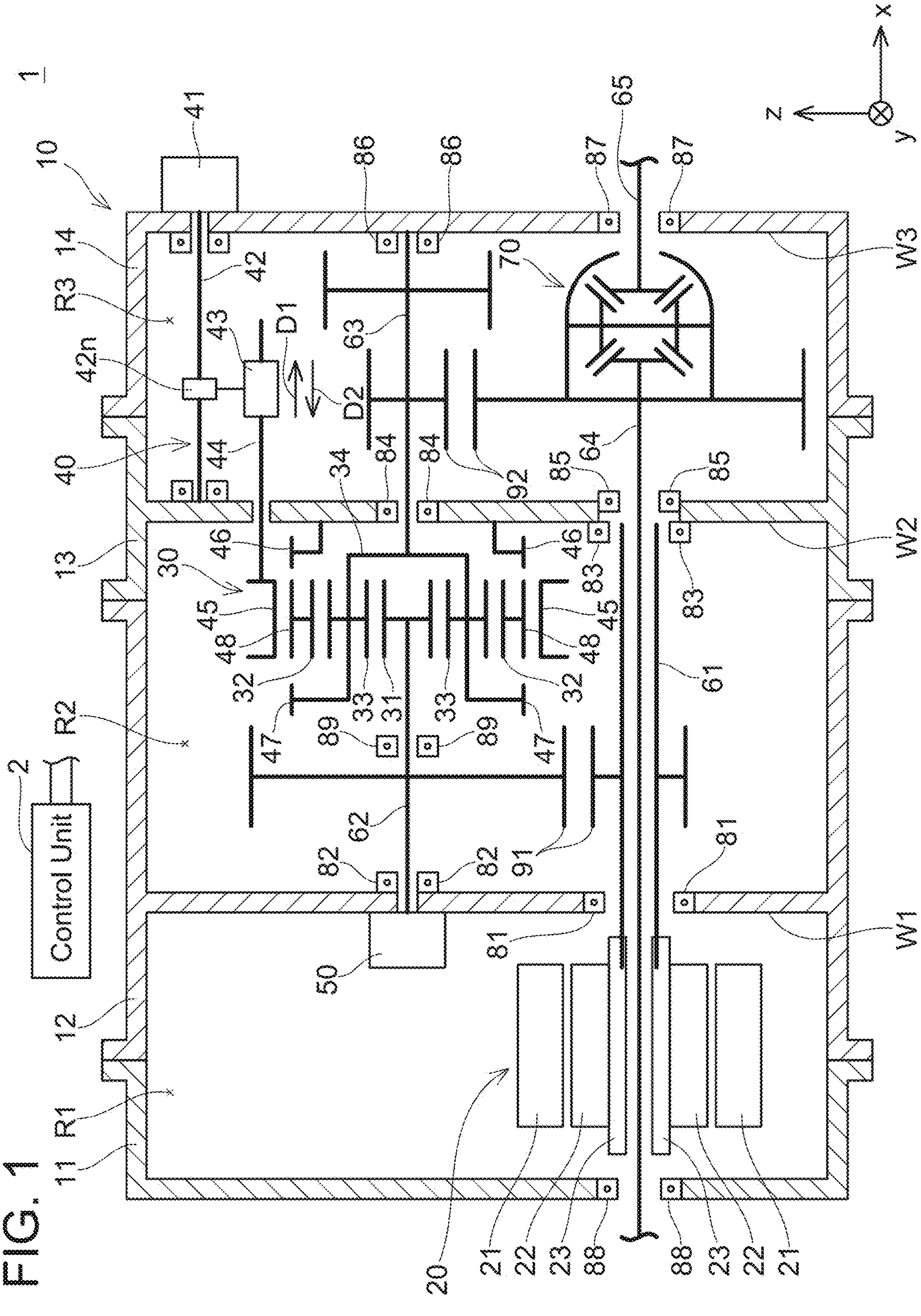
FIG. 1 is a skeleton diagram showing a schematic configuration of a driving device 1.

In an embodiment of the technique disclosed herein, the transmission mechanism may comprise a coupling component and an actuator configured to move the coupling component between a first position and a second position. When the coupling component is in the first position, the first mode may be implemented by uncoupling the ring gear from the carrier and coupling the ring gear to the casing in a state of not being able to rotate relative to the casing. When the coupling component is in the second position, the second mode may be implemented by uncoupling the ring gear from the casing and coupling the ring gear to the carrier in a state of not being able to rotate relative to the carrier.

The coupling component may for example be a dog clutch. The dog clutch can simplify the structure compared to a wet-type multiplate clutch.

According to the above configuration, the operation mode of the planetary gear mechanism can be switched between the first mode and the second mode by the coupling component.

In an embodiment of the technique disclosed herein, the casing may comprise a first ring section disposed coaxially with the ring gear. The carrier may comprise a second ring section disposed coaxially with the ring gear. The ring gear may comprise a ring gear hub fixed to an outer circumference of the ring gear. An outer circumference of each of the ring gear hub, the first ring section, and the second ring section may comprise an outer circumferential spline. The coupling component may comprise a sleeve disposed slidable along an axial direction of the ring gear. An inner circumference of the sleeve may comprise an inner circumferential spline configured to engage with the respective outer circumferential splines of the ring gear hub, the first ring section, and the second ring section. When the sleeve is in the first position, the sleeve may be engaged with the ring gear hub and the first ring section but not engaged with the second ring section. When the sleeve is in the second position, the sleeve may be engaged with the ring gear hub and the second ring section but not engaged with the first ring section.

According to the above configuration, the operating mode of the planetary gear mechanism can be switched by the sleeve.

In an embodiment of the technique disclosed herein, the driving device may comprise a second shaft disposed parallel to the first shaft and having the sun gear disposed at one end thereof, and to which driving force of the first shaft is transmitted. The driving device may comprise a third shaft disposed coaxially with the second shaft and having the carrier disposed at one end thereof, and to which driving force output from the planetary gear mechanism is transmitted. The output shaft may be disposed coaxially with the first shaft. Driving force of the third shaft may be transmitted to the output shaft.

According to the above configuration, space efficiency of an output shaft arrangement can be improved. Size of the driving device can be decreased.

In an embodiment of the technique disclosed herein, the first shaft may comprise a hollow structure. The output shaft may penetrate through the first shaft.

According to the above configuration, a space for arranging the output shaft can be decreased. The size of the driving device can be decreased.

In an embodiment of the technique disclosed herein, the driving device may comprise a differential gear mechanically connected to the third shaft. The output shaft may comprise a first output shaft and a second output shaft that are coaxially disposed with respect to each other. One end of the first output shaft may be coupled to the differential gear and another end thereof may penetrate through the first shaft. One end of the second output shaft may be coupled to the differential gear.

According to the above configuration, the size of the driving device can be decreased in a configuration with the first output shaft and the second output shaft.

In an embodiment of the technique disclosed herein, the casing may comprise a first chamber, a second chamber, and a third chamber. The motor may be housed in the first chamber. The planetary gear mechanism and a first pair of gears coupling the first shaft and the second shaft may be housed in the second chamber. A second pair of gears coupling the third shaft and the output shaft may be housed in the third chamber. The first chamber, the second chamber, and the third chamber may be arranged in this order along an axial direction of the first shaft.

According to the above configuration, space efficiency of the casing can be improved. The size of the driving device can be decreased.

In an embodiment of the technique disclosed herein, the casing may further comprise a first wall separating the first chamber from the second chamber, a second wall separating the second chamber from the third chamber, and a third wall defining the third chamber between the third wall and the second wall. A first bearing that rotatably supports the first shaft and a second bearing that rotatably supports the second shaft may be disposed on the first wall. A third bearing that rotatably supports the first shaft, a fourth bearing that rotatably supports the third shaft, and a fifth bearing that rotatably supports the output shaft may be disposed on the second wall, and A sixth bearing that rotatably supports the third shaft and a seventh bearing that rotatably supports the output shaft may be disposed on the third wall.

According to the above configuration, an assembly process of the driving device can be simplified.

In an embodiment of the technique disclosed herein, the driving device may further comprise an oil pump configured to circulate oil inside the casing. The oil pump may be mechanically connected to the sun gear and is driven in accordance with rotation of the sun gear.

According to the above configuration, an amount of oil circulation can be increased in accordance with a speed increase in the sun gear.

In an embodiment of the technique disclosed herein, the actuator may be a rotary actuator. The transmission mechanism may comprise a linear motion mechanism configured to convert rotational motion output by the actuator into linear motion. The transmission mechanism may comprise a shift fork configured to transmit the linear motion output by the linear motion mechanism to the sleeve.

According to the above configuration, the sleeve can be slid freely in the axial direction of the ring gear.

In an embodiment of the technique disclosed herein, the linear motion mechanism may comprise a ball screw.

In an embodiment of the technique disclosed herein, the shift fork may be configured movable in both first and second directions along the axial direction of the ring gear, the first direction being a direction separating away from the ring gear and the second direction being a direction approaching the ring gear. The transmission mechanism may further comprise a biasing section that applies biasing force to the shift fork along the axial direction of the ring gear. The biasing section may apply the biasing force in the first direction when the shift fork moves in the first direction, and may apply the biasing force in the second direction when the shift fork moves in the second direction.

According to the above configuration, the sleeve can smoothly be engaged with the first ring section by the biasing force in the first direction. Further, the sleeve can smoothly be engaged with the second ring section by the biasing force in the second direction.

Representative, non-limiting examples of the present disclosure will now be described in further detail with reference to the attached drawings. This detailed description is merely intended to teach a person of skill in the art further details for practicing aspects of the present teachings and is not intended to limit the scope of the disclosure. Furthermore, each of the additional features and teachings disclosed below may be utilized separately or in conjunction with other features and teachings to provide improved driving devices.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiments

Configuration of Driving Device 1

FIG. 1 is a skeleton diagram for explaining a structure of a driving device 1 of an electric vehicle. The driving device 1 is a device configured to drive a pair of left and right wheels (not shown) of the vehicle. The driving device 1 may be an integrated device that houses a motor, a gear unit, and a power conversion unit for controlling the motor in a single casing. In FIG. 1, axial directions of a first shaft 61, a second shaft 62, a ring gear 32, a third shaft 63, a first output shaft 64, and a second output shaft 65 are set in an x direction. Further, a casing 10 is shown in a cross-sectional view, and components of the casing 10 are hatched. The same is true in the subsequent figures.

The driving device 1 is controlled by a control unit 2. The control unit 2 comprises a central processing unit (CPU), random access memory (RAM), read-only memory (ROM), input/output interface, etc. The control unit 2 is connected to the motor 20, an actuator 41, and other devices via signal lines that are not shown.

The driving device 1 primarily comprises the casing 10, the motor 20, a planetary gear mechanism 30, a transmission mechanism 40, an oil pump 50, the first shaft 61, the second shaft 62, the third shaft 63, the first output shaft 64, the second output shaft 65, and a differential gear 70. Additional shafts, such as a fourth shaft, may be provided in addition to the first shaft 61, the second shaft 62, and the third shaft 63.

The casing 10 has a structure in which a motor cover 11, a center casing 12, an intermediate casing 13, and a gear cover 14, are disposed side by side along the x-direction. Each of these casings may be castings. These four members are fixed together to constitute the casing 10. The casing 10 comprises a first chamber R1, a second chamber R2, and a third chamber R3. The first, second, and third chambers are disposed in this order along the axial direction of the first shaft 61 (i.e., x direction). The casing 10 comprises a first wall W1, a second wall W2, and a third wall W3. The first wall W1 separates the first chamber R1 from the second chamber R2. The second wall W2 separates the second chamber R2 from the third chamber R3. The third wall W3 defines the third chamber R3 between itself and the second wall W2.

The first wall W1 is provided with bearings 81 and 82. The bearing 81 rotatably supports the first shaft 61. The bearing 82 rotatably supports the second shaft 62. The second wall W2 is provided with bearings 83, 84, and 85. The bearing 83 rotatably supports the first shaft 61. The bearing 84 rotatably supports the third shaft 63. The bearing 85 rotatably supports the first output shaft 64. Bearings 86 and 87 are provided in the third wall W3. The bearing 86 rotatably supports the third shaft 63. The bearing 87 rotatably supports the second output shaft 65.

Effects will be explained. The first wall W1, the second wall W2, and the third wall W3 have the respective bearings disposed thereon. Due to this, three assemblies, namely: an assembly with the first wall W1, an assembly with the second wall W2, and an assembly with the third wall W3, can be pre-assembled. Further, in a final assembly process, these three assemblies can be assembled. This enables to simplify the assembly process of the driving device 1.

The first chamber R1 mainly houses the motor 20 and the oil pump 50. The motor 20 comprises a stator 21, a rotor 22, and a motor shaft 23. The stator 21 has a cylindrical shape. The rotor 22 is disposed inside the stator 21 in a rotatable manner. The motor shaft 23 is fixed to the rotor 22.

The second chamber R2 mainly houses the first shaft 61, the second shaft 62, a first gear pair 91, the planetary gear mechanism 30, and a part of the transmission mechanism 40. The first shaft 61 is coaxially connected to the motor shaft 23. The first shaft and the motor shaft 23 have a hollow structure. The first shaft 61 is supported by the bearings 81 and 83. The first shaft 61 is driven by the motor 20.

The second shaft 62 is disposed parallel to the first shaft 61. The second shaft 62 is supported by the bearings 82 and 89. The first shaft 61 and the second shaft 62 are coupled by the first gear pair 91. Driving force of the first shaft 61 is transmitted to the second shaft 62.

The planetary gear mechanism 30 comprises a sun gear 31, a ring gear 32, a planetary gear 33, and a carrier 34. The sun gear 31 is disposed at an end of the second shaft 62 on a +x direction side. The sun gear 31 is mechanically connected to the motor shaft 23 via the first gear pair 91 and the first shaft 61. Due to this, the planetary gear mechanism 30 uses the sun gear 31 as an input and the carrier 34 as an output.

An end of the second shaft 62 on a −x direction side is connected to the oil pump 50. The oil pump 50 is thereby mechanically connected to the sun gear 31. The oil pump 50 is a unit for circulating oil in the casing 10. The oil pump 50 is a mechanical pump and is driven in accordance with rotation of the sun gear 31. Due to this, an amount of the circulated oil can be increased in accordance with a speed increase in the sun gear 31. Occurrences of seizure and wear in the various gears in the casing 10 can effectively be prevented.

The third chamber R3 mainly houses the third shaft 63, the second gear pair 92, the differential gear 70, the first output shaft 64, the second output shaft 65, and a part of the transmission mechanism 40. The third shaft 63 is disposed coaxially with the second shaft 62. The third shaft 63 is supported by the bearings 84 and 86. An end of the third shaft 63 on the −x direction side is connected to the carrier 34. Driving force output from the planetary gear mechanism 30 is transmitted to the third shaft 63. The third shaft 63 is coupled to the differential gear 70 by the second gear pair 92. The second gear pair 92 is a pair of gears composed of a parallel gear disposed on the third shaft 63 and a ring gear in the differential gear 70.

The differential gear 70 is a mechanism configured to distribute driving power transmitted from the third shaft 63 to an output shaft pair composed of the first output shaft 64 and the second output shafts 65 located on left and right sides. The first output shaft 64 and the second output shaft 65 are disposed coaxially with each other. The first output shaft 64 and the second output shaft 65 are shafts for outputting the driving force to a pair of tires (not shown).

The first output shaft 64 is supported by the bearings 85 and 88. An end of the first output shaft 64 on the +x direction side is connected to the differential gear 70. An end of the first output shaft 64 on the −x direction side penetrates through the first shaft 61. Due to this, a space for arranging the first output shaft 64 can be decreased, by which a size of the driving device 1 can be decreased.

The second output shaft 65 is supported by the bearing 87. An end of the second output shaft 65 on the −x direction side is connected to the differential gear 70.

Configuration of Transmission Mechanism 40

The transmission mechanism 40 mainly comprises an actuator 41, a ball screw 42, a biasing section 43, a shift fork 44, a sleeve 45, a first ring section 46, a second ring section 47, and a ring gear hub 48. The first ring section 46 is disposed coaxially with the ring gear 32 and is disposed on the second wall W2. The second ring section 47 is disposed coaxially with the ring gear 32 and is disposed on the carrier 34. The ring gear hub 48 is disposed coaxially with the ring gear 32 and is fixed to an outer circumference of the ring gear 32. Each of the first ring section 46, the second ring section 47, and the ring gear hub 48 has an outer circumferential spline formed on an outer circumference thereof. The sleeve 45 is disposed slidable along an axial direction of ring gear 32 (i.e., the x direction). An inner spline is disposed on an inner circumference of the sleeve 45. The inner circumferential spline is configured to engage with the outer circumferential splines of the first ring section 46, the second ring section 47, and the ring gear hub 48. This constitutes a so-called dog clutch. Alternatively, the outer circumferential spline may be disposed on the ring gear 32 without intervention of the ring gear hub 48, and the ring gear 32 may thereby be configured engageable. Further, the outer circumferential splines may respectively be disposed on a first ring hub connected to the first ring section 46 and a second ring hub connected to the second ring section 47, and the first and second ring hubs may thereby be configured engageable.

The actuator 41 is a rotary actuator. In this embodiment, the actuator 41 is a motor. The ball screw 42 is a linear motion mechanism configured to convert rotary motion output by the actuator 41 into linear motion. A nut 42*n* of the ball screw 42 is connected to the shift fork 44 via the biasing section 43. An end of shift fork 44 on the −x direction side is connected to the sleeve 45. The shift fork 44 is a component configured to transmit the linear motion output by the ball screw 42 to the sleeve 45. The shift fork 44 configured to move in a first direction D1 and in a second direction D2 along the axial direction of the ring gear 32. The first direction D1 is a direction separating away from the ring gear 32 (i.e., +x direction). The second direction D2 is the direction approaching the ring gear 32 (i.e., −x direction).

The biasing section 43 comprises a spring that is not shown, and is configured to apply force onto the shift fork 44 in the axial direction of the ring gear. The biasing section 43 applies force onto the shift fork 44 in the first direction D1 when the shift fork 44 moves in the first direction D1. Further, the biasing section 43 applies force onto the shift fork 44 in the second direction D2 when the shift fork 44 moves in the second direction D2. Specific structure for realizing functions of the biasing section 43 is well known, thus a detailed description is omitted.

Operation of Transmission Mechanism 40

The transmission mechanism 40 is a mechanism configured to switch an operation mode of the planetary gear mechanism 30 between a first mode and a second mode. In the first mode, rotation of the motor 20 is transmitted to the output shaft after being decelerated. In the second mode, the rotation of the motor 20 is transmitted to the output shaft without being decelerated. Switching of the operating mode is performed by moving the sleeve 45 between a first position P1 and a second position P2. This will further be explained.

Figure 2:
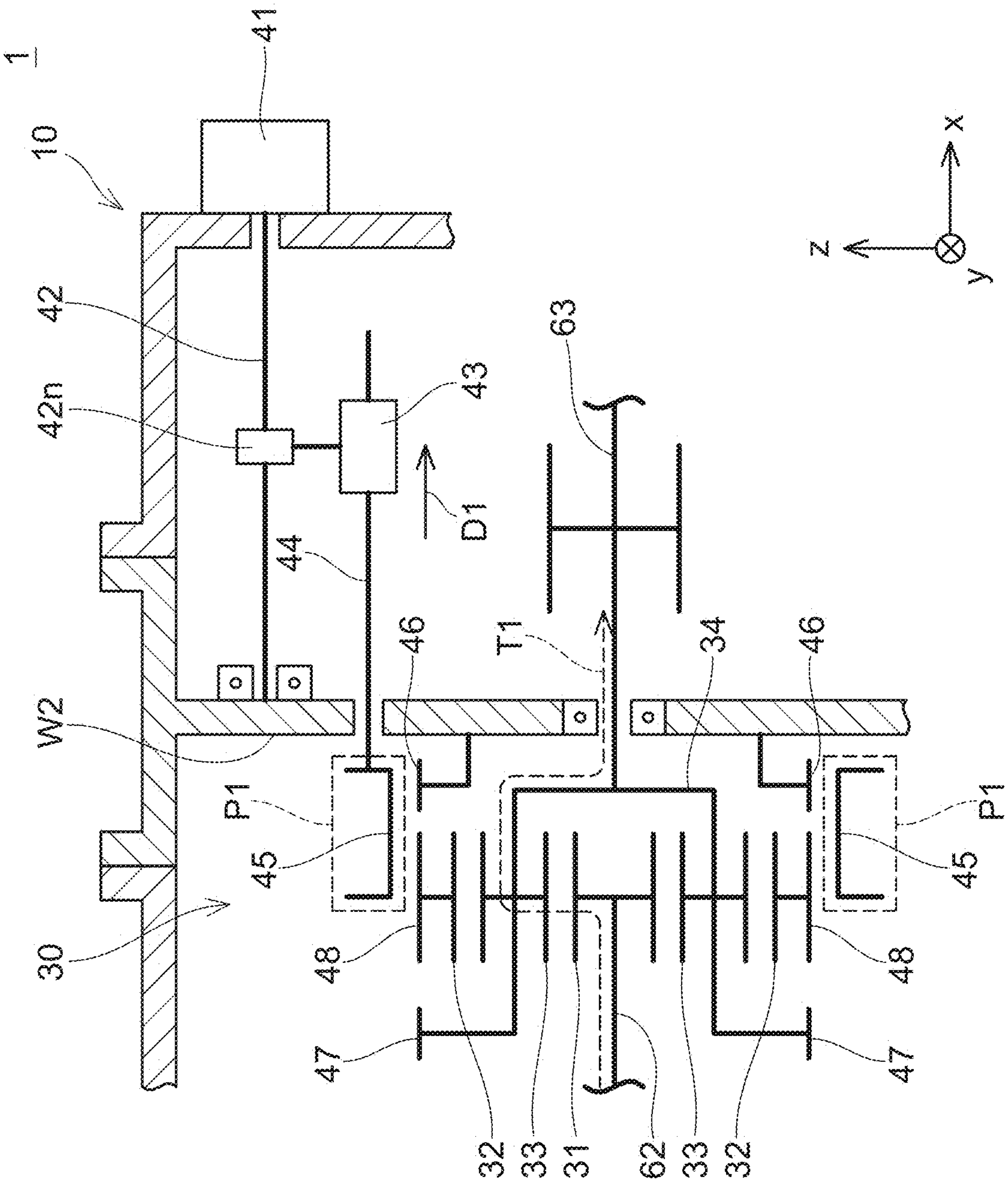
FIG. 2 is an enlarged view of an area including a planetary gear mechanism 30 for explaining a first mode.

The first mode will be explained using FIG. 2. FIG. 2 is an enlarged view of an area including the planetary gear mechanism 30. In the first mode, the sleeve 45 is in the first position P1. In the first position P1, the sleeve 45 is engaged with the ring gear hub 48 and the first ring section 46 but not engaged with the second ring section 47. The ring gear 32 is coupled to the casing 10 in a state in which rotation of the ring gear 32 relative to the casing 10 is prohibited, and the ring gear 32 is uncoupled from the carrier 34. That is, in the first mode, the ring gear 32 is prohibited from rotating relative to the casing 10 and the ring gear 32 is allowed to rotate relative to the carrier 34. Due to this, the carrier 34 can rotate about a central axis of the sun gear 31. Due to this, rotation of the first shaft 61 is transmitted to the carrier 34 via the sun gear 31 and the planetary gear 33 (see transmission path T1 indicated by dotted arrow). As a result, the planetary gear mechanism 30 functions as a reduction gear.

Figure 3:
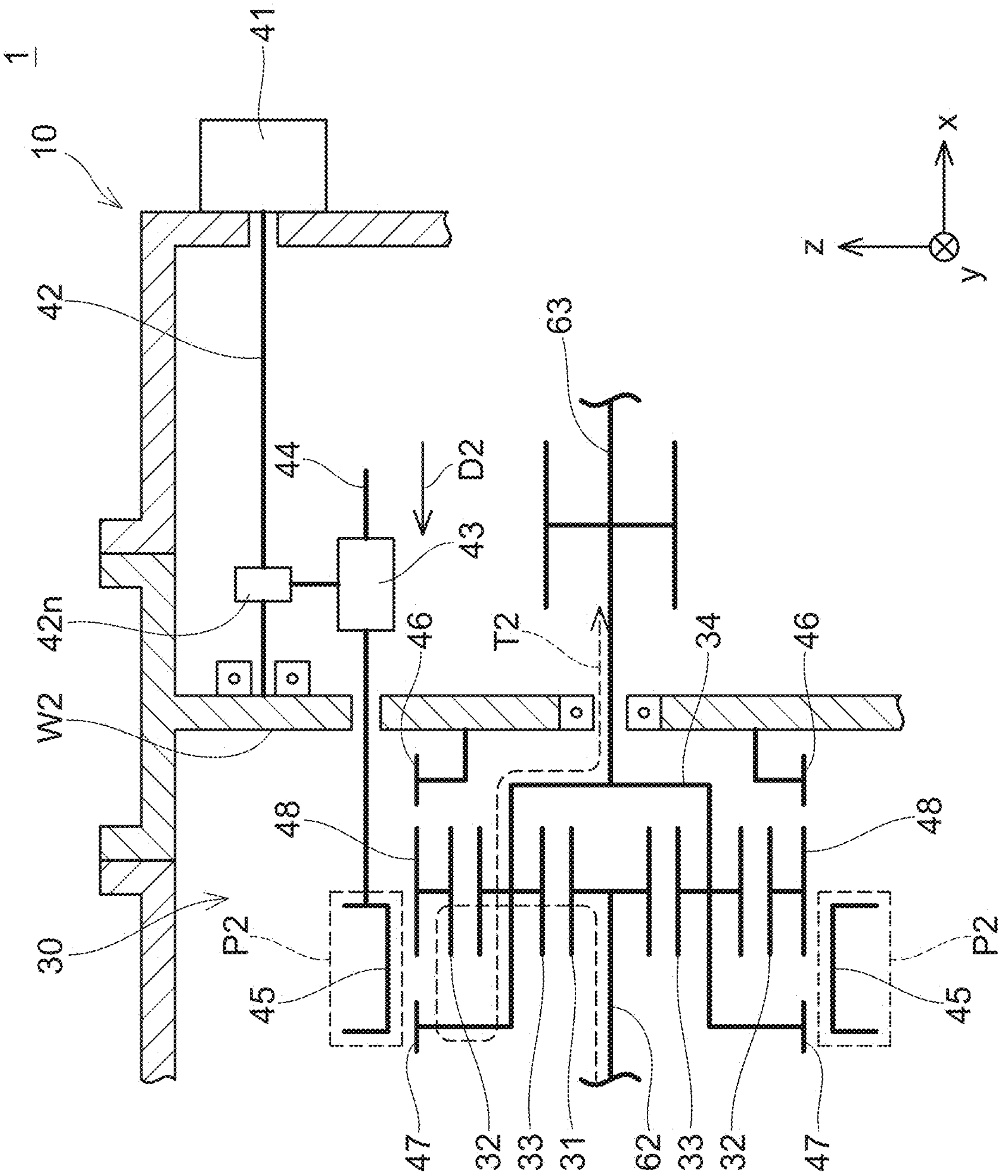
FIG. 3 is an enlarged view of the area including the planetary gear mechanism 30 for explaining a second mode.

The second mode will be explained using FIG. 3. FIG. 3 is an enlarged view of the area including the planetary gear mechanism 30. In the second mode, the sleeve 45 is in the second position P2. In the second position P2, the sleeve 45 engages with the ring gear hub 48 and the second ring section 47 but does not engage with the first ring section 46. The ring gear 32 is connected to the carrier 34 in a state in which rotation of the ring gear 32 relative to the carrier 34 is prohibited, and the ring gear 32 is uncoupled from the casing 10. That is, in the second mode, the ring gear 32 is prohibited from rotating relative to the carrier 34 and the ring gear 32 is allowed to rotate relative to the casing 10. Due to this, the carrier 34 and the ring gear 32 rotate together with the sun gear 31. Due to this, rotation of the first shaft 61 is transmitted to the carrier 34 via the sun gear 31, the planetary gear 33, the ring gear 32, the ring gear hub 48, the sleeve 45, and the second ring section 47 (see transmission path T2 indicated by dotted arrow). As a result, the planetary gear mechanism 30 does not function as a reduction gear.

The movement of the sleeve 45 will be explained. When the sleeve 45 is to be moved to the first position P1, the actuator 41 moves the nut 42*n* in the first direction D1 (see FIG. 2). In accordance with movement of the nut 42*n*, the shift fork 44 and the sleeve 45 also move in the first direction D1. Since the biasing force in the first direction D1 is applied by the biasing section 43, the sleeve 45 can smoothly engage with the first ring section 46.

On the other hand, when moving the sleeve 45 to the second position P2, the actuator 41 moves the nut 42*n* in the second direction D2. In accordance with the movement of nut 42*n*, the shift fork 44 and the sleeve 45 also move in the second direction D2. Since the biasing force in the second direction D2 is applied by the biasing section 43, the sleeve 45 can smoothly engage with the second ring section 47.

Effects

The art disclosed herein allows the planetary gear mechanism 30 to switch between the first mode functioning as a reduction gear and the second mode not functioning as a reduction gear. By using the planetary gear mechanism 30, there is no need to add new transmission gears or other components. It is possible to incorporate a transmission mechanism in the driving device 1 while suppressing structural complexity and size increase.

The art disclosed herein allows the motor 20, the planetary gear mechanism 30, the respective gears, and the respective shafts to be stored in the first, second, and third chambers R1, R2, and R3. Since an integrated driving device 1 can be realized, it is possible to reduce the size thereof.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

Variants

The driving device 1 may comprise only one of the first output shaft 64 and the second output shaft 65. In this case, the differential gear 70 may be omitted.

Although the sleeve 45 is described herein as an example of a coupling component, the art disclosed herein is not limited to this embodiment. The coupling component may be a pin or a ball.

The linear motion mechanism configured to converts the rotary motion output by the actuator 41 into linear motion is not limited to the ball screw. Various mechanisms, such as rack and pinion mechanisms, can be used. Further, the actuator 41 is not limited to the rotary actuator, but may be a linear motion actuator. In this case, the linear motion mechanism configured to convert the rotary motion to linear motion may be omitted.

The first and second modes are examples of multiple modes. The multiple modes may include other modes, for example, a neutral mode.

The vehicle in which the driving device disclosed herein is installed is not limited to electric vehicles. The driving device disclosed herein may be installed in hybrid vehicles and plug-in hybrid vehicles, for example. Further, the driving device disclosed herein may also be applied to vehicles that use electric motors for at least part of their driving, such as fuel cell vehicles, for example.

The ball screw 42 is an example of a linear motion mechanism. The sleeve 45 is an example of a coupling component.

What is claimed is:

1. A driving device for a vehicle, the driving device comprising:
a motor;
a first shaft configured to be driven by the motor;
a planetary gear mechanism that comprises a sun gear, a ring gear, a carrier, and a planetary gear;
a casing that houses the planetary gear mechanism;
an output shaft configured to output driving force to outside;
a second shaft disposed parallel to the first shaft and having the sun gear disposed at one end thereof, and to which driving force of the first shaft is transmitted; and
a third shaft disposed coaxially with the second shaft and having the carrier disposed at one end thereof, and to which driving force output from the planetary gear mechanism is transmitted; and
a transmission mechanism configured to switch an operation mode of the planetary gear mechanism among multiple modes,
wherein
the first shaft is mechanically connected to the sun gear;
the output shaft is disposed coaxially with the first shaft;
driving force of the third shaft is transmitted to the output shaft;
the output shaft is mechanically connected to the carrier; and
the multiple modes include:
a first mode in which rotation of the ring gear relative to the casing is prohibited but rotation of the ring gear relative to the carrier is permitted; and
a second mode in which the rotation of the ring gear relative to the carrier is prohibited but the rotation of the ring gear relative to the casing is permitted.

2. The driving device according to claim 1, wherein
the transmission mechanism comprises:
a coupling component; and
an actuator configured to move the coupling component between a first position and a second position,
wherein
when the coupling component is in the first position, the first mode is implemented by uncoupling the ring gear from the carrier and coupling the ring gear to the casing in a state of not being able to rotate relative to the casing, and
when the coupling component is in the second position, the second mode is implemented by uncoupling the ring gear from the casing and coupling the ring gear to the carrier in a state of not being able to rotate relative to the carrier.

3. The driving device according to claim 2, wherein
the casing comprises a first ring section disposed coaxially with the ring gear,
the carrier comprises a second ring section disposed coaxially with the ring gear,
the ring gear comprises a ring gear hub fixed to an outer circumference of the ring gear,
an outer circumference of each of the ring gear hub, the first ring section, and the second ring section comprises an outer circumferential spline,
the coupling component comprises a sleeve disposed slidable along an axial direction of the ring gear,
an inner circumference of the sleeve comprises an inner circumferential spline configured to engage with the respective outer circumferential splines of the ring gear hub, the first ring section, and the second ring section,
when the sleeve is in the first position, the sleeve is engaged with the ring gear hub and the first ring section but not engaged with the second ring section, and
when the sleeve is in the second position, the sleeve is engaged with the ring gear hub and the second ring section but not engaged with the first ring section.

4. The driving device according to claim 1, wherein
the first shaft comprises a hollow structure, and
the output shaft penetrates through the first shaft.

5. The driving device according to claim 1, further comprising:
a differential gear mechanically connected to the third shaft,
wherein the output shaft comprises a first output shaft and a second output shaft that are coaxially disposed with respect to each other,
one end of the first output shaft is coupled to the differential gear and another end thereof penetrates through the first shaft, and
one end of the second output shaft is coupled to the differential gear.

6. The driving device according to claim 1, wherein
the casing comprises a first chamber, a second chamber, and a third chamber,
the motor is housed in the first chamber,
the planetary gear mechanism and a first pair of gears coupling the first shaft and the second shaft are housed in the second chamber,
a second pair of gears coupling the third shaft and the output shaft is housed in the third chamber, and
the first chamber, the second chamber, and the third chamber are arranged in this order along an axial direction of the first shaft.

7. The driving device according to claim 6, wherein
the casing further comprises a first wall separating the first chamber from the second chamber, a second wall separating the second chamber from the third chamber, and a third wall defining the third chamber between the third wall and the second wall,
a first bearing that rotatably supports the first shaft and a second bearing that rotatably supports the second shaft are disposed on the first wall,
a third bearing that rotatably supports the first shaft, a fourth bearing that rotatably supports the third shaft, and a fifth bearing that rotatably supports the output shaft are disposed on the second wall, and a sixth bearing that rotatably supports the third shaft and a seventh bearing that rotatably supports the output shaft are disposed on the third wall.

8. The driving device according to claim 3, wherein the actuator is a rotary actuator, and
the transmission mechanism comprises:
a linear motion mechanism configured to convert rotational motion output by the actuator into linear motion; and
a shift fork configured to transmit the linear motion output by the linear motion mechanism to the sleeve.

9. The driving device according to claim 8, wherein the linear motion mechanism comprises a ball screw.

10. The driving device according to claim 8, wherein
the shift fork is configured movable in both first and second directions along the axial direction of the ring gear, the first direction being a direction separating away from the ring gear and the second direction being a direction approaching the ring gear,
the transmission mechanism further comprises a biasing section that applies biasing force to the shift fork along the axial direction of the ring gear, and
the biasing section applies the biasing force in the first direction when the shift fork moves in the first direction, and applies the biasing force in the second direction when the shift fork moves in the second direction.

11. A driving device for a vehicle, the driving device comprising:
a motor;
a first shaft configured to be driven by the motor;
a planetary gear mechanism that comprises a sun gear, a ring gear, a carrier, and a planetary gear;
a casing that houses the planetary gear mechanism;
an output shaft configured to output driving force to outside; and
a transmission mechanism configured to switch an operation mode of the planetary gear mechanism among multiple modes, the transmission mechanism comprises:
a coupling component; and
an actuator configured to move the coupling component between a first position and a second position;
wherein
the first shaft is mechanically connected to the sun gear;
the output shaft is mechanically connected to the carrier; and
the multiple modes include:
a first mode in which rotation of the ring gear relative to the casing is prohibited but rotation of the ring gear relative to the carrier is permitted;
a second mode in which the rotation of the ring gear relative to the carrier is prohibited but the rotation of the ring gear relative to the casing is permitted;
when the coupling component is in the first position, the first mode is implemented by uncoupling the ring gear from the carrier and coupling the ring gear to the casing in a state of not being able to rotate relative to the casing;
when the coupling component is in the second position, the second mode is implemented by uncoupling the ring gear from the casing and coupling the ring gear to the carrier in a state of not being able to rotate relative to the carrier;
the casing comprises a first ring section disposed coaxially with the ring gear;
the carrier comprises a second ring section disposed coaxially with the ring gear;
the ring gear comprises a ring gear hub fixed to an outer circumference of the ring gear;
an outer circumference of each of the ring gear hub, the first ring section, and the second ring section comprises an outer circumferential spline;
the coupling component comprises a sleeve disposed slidable along an axial direction of the ring gear;
an inner circumference of the sleeve comprises an inner circumferential spline configured to engage with the respective outer circumferential splines of the ring gear hub, the first ring section, and the second ring section;
when the sleeve is in the first position, the sleeve is engaged with the ring gear hub and the first ring section but not engaged with the second ring section; and
when the sleeve is in the second position, the sleeve is engaged with the ring gear hub and the second ring section but not engaged with the first ring section;
the actuator is a rotary actuator;
the transmission mechanism comprises:
a linear motion mechanism configured to convert rotational motion output by the actuator into linear motion; and
a shift fork configured to transmit the linear motion output by the linear motion mechanism to the sleeve;
the shift fork is configured movable in both first and second directions along the axial direction of the ring gear, the first direction being a direction separating away from the ring gear and the second direction being a direction approaching the ring gear;
the transmission mechanism further comprises a biasing section that applies biasing force to the shift fork along the axial direction of the ring gear; and
the biasing section applies the biasing force in the first direction when the shift fork moves in the first direction, and applies the biasing force in the second direction when the shift fork moves in the second direction.

12. A driving device for a vehicle, the driving device comprising:
a motor;
a first shaft configured to be driven by the motor;
a planetary gear mechanism that comprises a sun gear, a ring gear, a carrier, and a planetary gear;
a casing that houses the planetary gear mechanism;
an oil pump configured to circulate oil inside the casing;
an output shaft configured to output driving force to outside; and
a transmission mechanism configured to switch an operation mode of the planetary gear mechanism among multiple modes,
wherein
the first shaft is mechanically connected to the sun gear;
the output shaft is mechanically connected to the carrier;
the multiple modes include:
a first mode in which rotation of the ring gear relative to the casing is prohibited but rotation of the ring gear relative to the carrier is permitted; and
a second mode in which the rotation of the ring gear relative to the carrier is prohibited but the rotation of the ring gear relative to the casing is permitted; and
the oil pump is mechanically connected to the sun gear and is driven in accordance with rotation of the sun gear.

* * * * *